(12) United States Patent
Chen et al.

(10) Patent No.: US 10,971,107 B2
(45) Date of Patent: Apr. 6, 2021

(54) DISPLAY DEVICE

(71) Applicant: InnoLux Corporation, Miao-Li County (TW)

(72) Inventors: Cheng-Tso Chen, Miao-Li County (TW); Hui-Min Huang, Miao-Li County (TW); Li-Wei Sung, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 239 days.

(21) Appl. No.: 15/729,817

(22) Filed: Oct. 11, 2017

(65) Prior Publication Data

US 2018/0122329 A1    May 3, 2018

Related U.S. Application Data

(60) Provisional application No. 62/416,679, filed on Nov. 2, 2016.

(30) Foreign Application Priority Data

Jun. 14, 2017   (CN) .......................... 2017 1 0447098

(51) Int. Cl.
*G09G 3/36* (2006.01)
*G09G 5/00* (2006.01)
*G09G 5/02* (2006.01)

(52) U.S. Cl.
CPC ............. *G09G 5/003* (2013.01); *G09G 5/026* (2013.01); *G09G 2300/0421* (2013.01); *G09G 2300/0439* (2013.01); *G09G 2380/02* (2013.01)

(58) Field of Classification Search
CPC .... G09G 5/003; G09G 5/026; G09G 2380/02; G09G 2300/0421; G09G 2300/0439; G09G 3/2077; G09G 3/2074; G09G 3/3607
See application file for complete search history.

(56) References Cited

U.S. PATENT DOCUMENTS 5,920,299 A * 7/1999 Ohshima .............. G09G 3/2003
                                                              345/88
9,142,572 B1    9/2015 Cheng et al.
(Continued)

FOREIGN PATENT DOCUMENTS

CN      101799605 A      8/2010
CN      104538409 A      4/2015

OTHER PUBLICATIONS

Chinese language office action dated Jul. 1, 2019, issued in application No. CN 201710447098.9.

*Primary Examiner* — Antonio Xavier
(74) *Attorney, Agent, or Firm* — McClure, Qualey & Rodack, LLP

(57) ABSTRACT

A display device is provided. A first pixel is coupled to a first scan line and a first data line and includes a first light-transmitting area. A second pixel is coupled to a second scan line and a second data line and includes a second light-transmitting area. The size of the second pixel is equal to the size of the first pixel. The area of the second light-transmitting area is different from the area of the first light-transmitting area. A first color area overlaps the first pixel. When first light passes through the first light-transmitting area and the first color area, the first light has a first color. A second color area overlaps the second pixel. When second light passes through the second light-transmitting area and the second color area, the second light has a second color, which is the same as the first color.

12 Claims, 6 Drawing Sheets

(56) References Cited

U.S. PATENT DOCUMENTS

| | | | |
|---|---|---|---|
| 2003/0085404 A1* | 5/2003 | Kim | G02F 1/13458 257/72 |
| 2008/0316596 A1* | 12/2008 | Cha | G02B 27/2214 359/463 |
| 2009/0140253 A1* | 6/2009 | Kasahara | H01L 27/1214 257/59 |
| 2009/0290105 A1* | 11/2009 | Takada | G02F 1/133528 349/96 |
| 2012/0026439 A1* | 2/2012 | Jung | G02F 1/1343 349/110 |
| 2012/0105735 A1* | 5/2012 | Tsubata | G09G 3/3614 348/731 |
| 2012/0229739 A1* | 9/2012 | Inoue | G02F 1/133753 349/99 |
| 2013/0021548 A1* | 1/2013 | Sung | G09G 3/3648 349/41 |
| 2013/0077284 A1* | 3/2013 | Chang | G02B 5/30 362/19 |
| 2013/0120470 A1* | 5/2013 | Djordjev | G09G 3/3466 345/690 |
| 2013/0141660 A1* | 6/2013 | Wang | G02F 1/136286 349/43 |
| 2013/0249976 A1* | 9/2013 | Kunieda | G09G 3/003 345/698 |
| 2014/0036191 A1* | 2/2014 | Zhao | G02F 1/136286 349/46 |
| 2014/0054624 A1* | 2/2014 | Chen | H01L 27/156 257/89 |
| 2014/0104549 A1* | 4/2014 | Suzuki | G02F 1/133514 349/106 |
| 2014/0266995 A1* | 9/2014 | Cho | G09G 3/3607 345/88 |
| 2015/0177579 A1* | 6/2015 | Lim | G02F 1/134336 345/90 |
| 2015/0331291 A1* | 11/2015 | Sakaigawa | G09G 3/3625 349/43 |
| 2016/0370931 A1* | 12/2016 | Sakamoto | G06F 3/0412 |
| 2017/0025053 A1* | 1/2017 | Broughton | G09G 3/2003 |
| 2017/0047026 A1* | 2/2017 | Tsuruma | G02F 1/13 |
| 2017/0068130 A1* | 3/2017 | Chen | G02F 1/133377 |
| 2017/0084247 A1* | 3/2017 | Yang | G09G 5/003 |
| 2017/0263691 A1* | 9/2017 | Seo | G02F 1/133504 |

* cited by examiner

DISPLAY DEVICE

CROSS REFERENCE TO RELATED APPLICATIONS

This application claims the benefit of U.S. Provisional Application No. 62/416,679 filed on Nov. 2, 2016, which is hereby incorporated by reference in its entirety.

This Application claims priority of China Patent Application No. 201710447098.9, filed on Jun. 14, 2017, the entirety of which is incorporated by reference herein.

BACKGROUND OF THE DISCLOSURE

Field of the Disclosure

The disclosure relates to an electronic device, and more particularly to a display device.

Description of the Related Art

Because cathode ray tubes (CRTs) are inexpensive and provide high definition, they are utilized extensively in televisions and computers. With technological developments, new flat-panel displays are continually being developed. When a larger display panel is required, the weight of the flat-panel display does not substantially change when compared to CRT displays.

BRIEF SUMMARY OF THE DISCLOSURE

In accordance with an embodiment, a display device comprises a non-display area and a display area. The display area is next to the non-display area and comprises a first scan line, a first data line, a first pixel, a second scan line, a second data line, a second pixel, a first color filter and a second color filter. The first scan line is extending along a first direction. The first data line is extending along a second direction. The first pixel is coupled to the first scan line and the first data line and comprises a first light-transmitting area. The second scan line is extending along the first direction. The second data line is extending along the second direction. The second pixel is coupled to the second scan line and the second data line and comprises a second light-transmitting area. The size of the second pixel is equal to the size of the first pixel. The area of the second light-transmitting area is different from the area of the first light-transmitting area. The first color filter overlaps the first pixel and comprises a first color area. When first light passes through the first light-transmitting area and the first color area, a color of the first light is a first color. The second color filter overlaps the second pixel and comprises a second color area. When second light passes through the second light-transmitting area and the second color area, a color of the second light is a second color. The second color is the same as the first color.

In accordance with another embodiment, a display device comprises a display area, a non-display area and a connection line. The display area comprises a first scan line, a first data line and a pixel. The first scan line is extending a first direction. The first data line is extending a second direction. The pixel is coupled to the first scan line and the first data line and comprises a pixel electrode. The non-display area is next to the display area and comprises a gate driver and a source driver. The source driver is located next to the gate driver. The connection line is coupled between the gate driver and the first scan line. The connection line is extended along the second direction in the display area.

In accordance with a further embodiment, a display device comprises a display area, a non-display area and a connection line. The display area comprises a first scan line, a first data line and a pixel. The first scan line is extending along a first direction. The first data line is extending along a second direction. The pixel is coupled to the first scan line and the first data line and comprises a pixel electrode. The non-display area is next to the display area and comprises a gate driver and a source driver. The source driver is located next to the gate driver. The connection line is coupled between the source driver and the first data line. In the display area, the connection line is extending along the first direction.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

Figure 1:
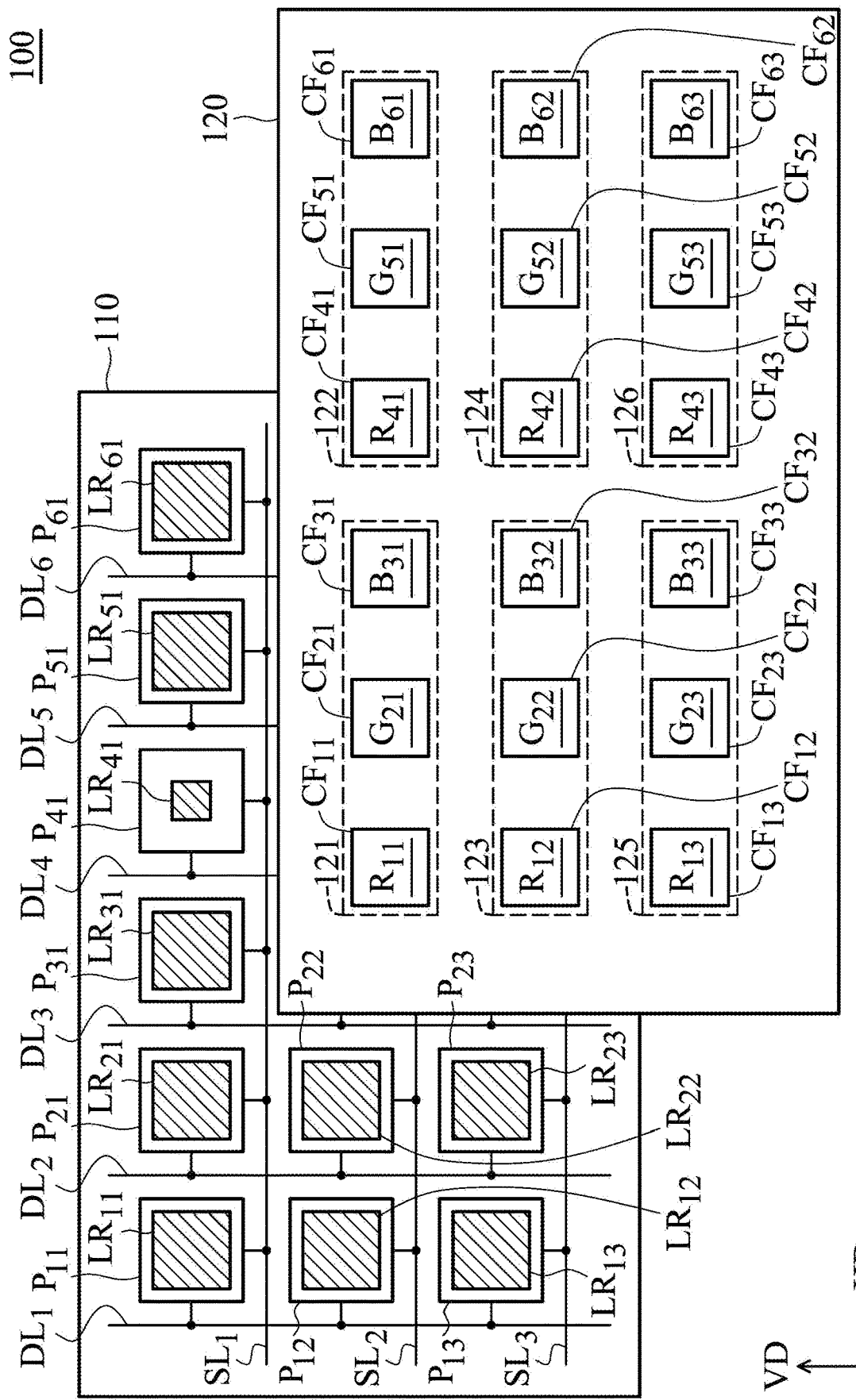
FIG. 1 is a schematic diagram of an exemplary embodiment of a display device, according to various aspects of the present disclosure.

The present disclosure will be described with respect to particular embodiments and with reference to certain drawings, but the disclosure is not limited thereto and is limited by the claims. The drawings described are schematic and are non-limiting. In the drawings, the size of some of the elements may be exaggerated for illustrative purposes and not drawn to scale. The dimensions and the relative dimensions do not correspond to actual dimensions in the practice of the disclosure.

FIG. 1 is a schematic diagram of an exemplary embodiment of a display device, according to various aspects of the present disclosure. The display device 100 comprises an array substrate 110 and a color filter substrate 120. The array substrate 110 comprises a plurality of scan lines and a plurality of data lines. For clarity, FIG. 1 shows the scan lines $SL_1$~$SL_3$ and the data lines $DL_1$~$DL_6$, but the disclosure is not limited thereto. In other embodiments, the array substrate 110 comprises a fewer scan lines or more scan lines and a fewer data lines or more data lines. In addition, FIG. 1 shows the display area of the array substrate 110. In other embodiments, the array substrate 110 further comprises a non-display area (not shown). The non-display area is adjacent to the display area. In one embodiment, the non-display area comprises a gate driver. The gate driver may directly be coupled to the scan lines $SL_1$~$SL_3$ or may be coupled to the scan lines $SL_1$~$SL_3$ via many connection lines. In another embodiment, the non-display area further comprises a source driver. The source driver may directly be coupled to the data lines $DL_1$~$DL_6$ or may be coupled to the data lines $DL_1$~$DL_6$ via many connection lines.

As shown in FIG. 1, the scan line $SL_1$, the scan line $SL_2$ and the scan line $SL_3$ are parallel with each other and extend along a first direction HD. Additionally, the data lines $DL_1$~$DL_6$ are parallel with each other and extend along a second direction VD. In this embodiment, the first direction HD is vertical with the second direction VD.

The array substrate 110 further comprises pixels $P_{11}$~$P_{63}$. Each of the pixels $P_{11}$~$P_{63}$ is coupled to a scan line and a data line and comprises a light-transmitting area. The pixel $P_{11}$ is referred to as a first pixel and given an example. The pixel $P_{11}$ is coupled to the scan line $SL_1$ and the data line $DL_1$ and comprises a light-transmitting area $LR_{11}$. In addition, the pixel $P_{41}$ is referred to as a second pixel and given an example. The pixel $P_{41}$ is coupled to the scan line $SL_1$ and the data line $DL_4$ and comprises a light-transmitting area $LR_{41}$. In one embodiment, each of the pixels $P_{11}$~$P_{63}$ comprises a switch (not shown) to control the transmittance of the light-transmitting area. The area of each pixel is determined by the positions of two neighboring scan lines and the positions of two neighboring data lines. The size of each pixel is the area of each pixel. For example, the area of the pixel $P_{12}$ is determined according to the positions of the scan lines $SL_1$ and $SL_2$ and the positions of the data lines $DL_1$ and $DL_2$. When a backlight module (not shown) under the array substrate 110 emits light, the light emitted by the backlight module can pass through the light-transmitting area of each pixel. In one embodiment, the light emitted from the backlight module is white light.

In the embodiment, the area of a first light-transmitting area of the light-transmitting areas $LR_{11}$~$LR_{63}$ of the array substrate 110 is different from the area of a second light-transmitting area of the light-transmitting areas $LR_{11}$~$LR_{63}$ of the array substrate 110. In one embodiment, the pixel (e.g. $P_{11}$) having the first light-transmitting area and the pixel (e.g. $P_{41}$) having the second light-transmitting area are coupled to the same scan line (e.g. $SL_1$). In another embodiment, the pixel (e.g. $P_{11}$) having the first light-transmitting area and the pixel (e.g. $P_{12}$) having the second light-transmitting area are coupled to the same data line (e.g. $DL_1$). In other embodiments, the scan line and the data line coupled to the pixel (e.g. $P_{11}$) having the first light-transmitting area are different from the scan line and the data line coupled to the pixel (e.g. $P_{42}$) having the second light-transmitting area.

The color filter substrate 120 is disposed on the array substrate 110 and comprises a plurality of filter modules. The number of filter modules is not limited in this disclosure. For clarity, FIG. 1 shows the filter modules 121~126. In this embodiment, each filter module comprises three color filters. The colors of the lights passing through the three color filters are red, green and blue. In other embodiments, each filter module may comprise four color filters. The colors of the lights passing through the four color filters are red, green, blue and white.

Since the structure of the filter modules 121~126 are the same, the filter modules 121 and 122 are given as an example. As shown in FIG. 1, the filter module 121 comprises the color filters $CF_{11}$, $CF_{21}$ and $CF_{31}$. The color filter $CF_{11}$ referred to as a first color filter overlaps the pixel $P_{11}$ and comprises a color area $R_{11}$. The color area $R_{11}$ overlaps the light-transmitting area $LR_{11}$. The light with a red color passes the color area $R_{11}$. The color filter $CF_{21}$ overlaps the pixel $P_{21}$ and comprises a color area $G_{21}$. The color area $G_{21}$ overlaps the light-transmitting area $LR_{21}$. The light with a green color passes the color area $G_{21}$. The color filter $CF_{31}$ overlaps the pixel $P_{31}$ and comprises a color area $B_{31}$. The color area $B_{31}$ overlaps the light-transmitting area $LR_{31}$. The light with a blue color passes the color area $B_{31}$.

As shown in FIG. 1, the filter module 122 comprises the color filters $CF_{41}$, $CF_{51}$ and $CF_{61}$. The color filter $CF_{41}$ referred to as a second color filter overlaps the pixel $P_{41}$ and comprises a color area $R_{41}$. The color area $R_{41}$ overlaps the light-transmitting area $LR_{41}$. The light with a red color passes the color area $R_{41}$. The color filter $CF_{51}$ overlaps the pixel $P_{51}$ and comprises a color area $G_{51}$. The color area $G_{51}$ overlaps the light-transmitting area $LR_{51}$. The light with a green color passes the color area $G_{51}$. The color filter $CF_{61}$ overlaps the pixel $P_{61}$ and comprises a color area $B_{61}$. The color area $B_{61}$ overlaps the light-transmitting area $LR_{61}$. The light with a blue color passes the color area $B_{61}$.

Figure 2A:
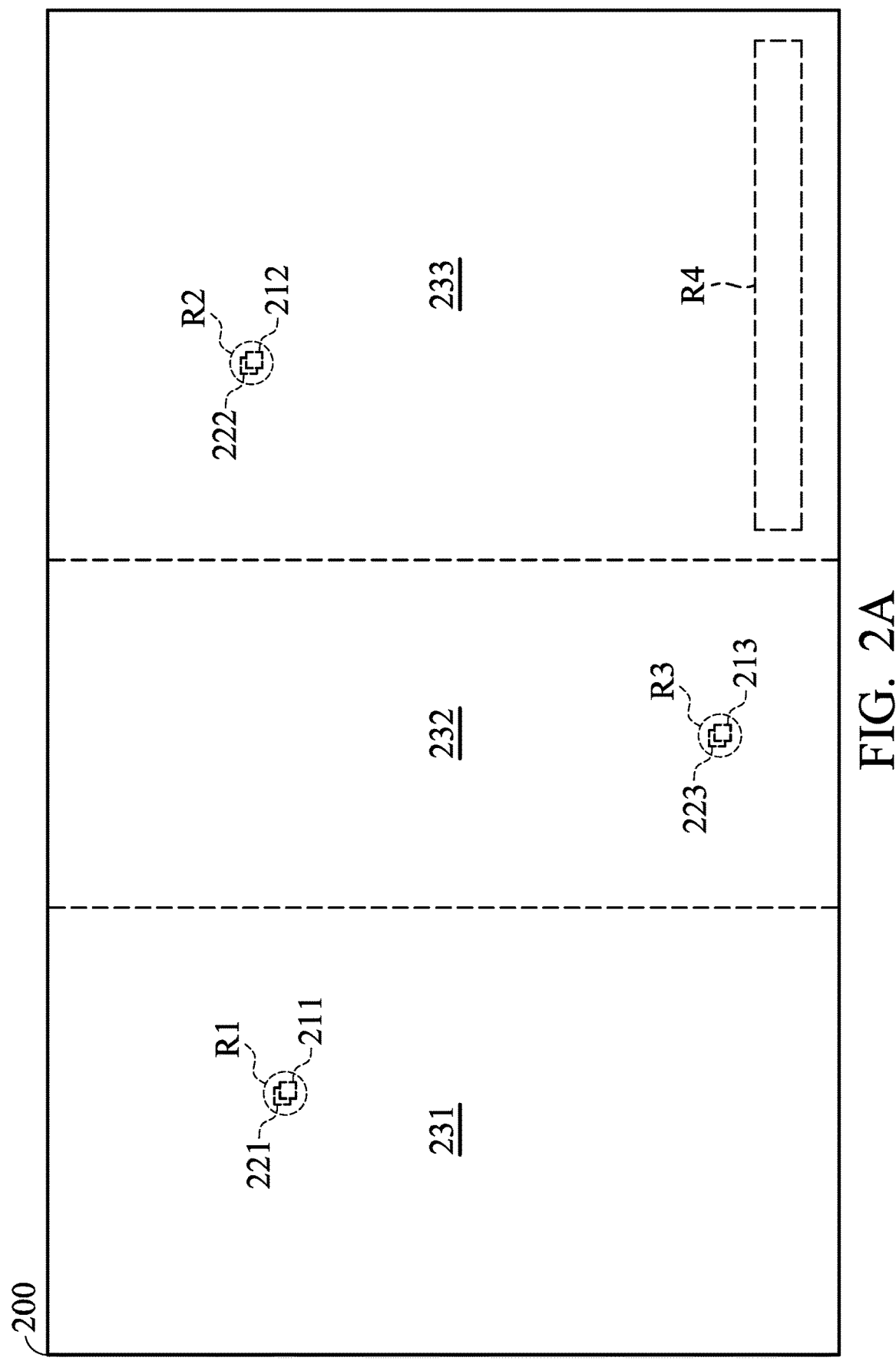
FIG. 2A is a schematic diagram of another exemplary embodiment of a display device, according to various aspects of the present disclosure.

In this embodiment, the area of one light-transmitting area corresponding to a first color area is different from the area of another light-transmitting area corresponding to a second color area, wherein the color of the light passing through the first color area is the same as the color of the light passing through the second color area. Referring to FIG. 2A, assume that the display device 200 comprises luminescent areas R1, R2 and R3, and the colors of the lights passing through the luminescent areas R1, R2 and R3 are the same. For example, the colors of the lights passing through the luminescent areas R1, R2 and R3 are red. As shown in FIG. 2A, the luminescent area R1 comprises a color area 211 and a light-transmitting area 221. The color area 211 overlaps the light-transmitting area 221. The luminescent area R2 comprises a color area 212 and a light-transmitting area 222. The color area 212 overlaps the light-transmitting area 222. The luminescent area R3 comprises a color area 213 and a light-transmitting area 223. The color area 213 overlaps the light-transmitting area 223.

In this embodiment, the area of at least one of the light-transmitting areas 221~223 is different from the area of another of the light-transmitting areas 221~223. For example, the area of the light-transmitting area 221 may be greater or smaller than the area of the light-transmitting area 222. In this case, a first pixel having the light-transmitting area 221 may be coupled to a first scan line, and a second pixel having the light-transmitting area 222 may be coupled to a second scan line. In one embodiment, the second scan line may be next to the first scan line. In another embodiment, at least one scan line is disposed between the first scan line and the second scan line. In other embodiment, the first pixel having the light-transmitting area 221 and the second pixel having the light-transmitting area 222 may be coupled to the same scan line. In this case, the light-transmitting area 221 may be next to the light-transmitting area 222. In some embodiments, at least one light-transmitting area is disposed between the light-transmitting areas 221 and 222. In one embodiment, the widths of the scan lines and the data lines are adjusted to control the areas of the light-transmitting areas.

In some embodiments, the color of the light passing through the luminescent area R1 is the same as the color of the light passing through the luminescent area R3. For example, the color of the lights passing through the luminescent areas R1 and R3 are red. In this case, the area of the light-transmitting area 221 of the luminescent area R1 may be equal to, greater than or smaller than the area of the light-transmitting area 223 of the luminescent area R3. In this case, the scan line coupled to the pixel having the light-transmitting area 223 may be the same as or different from the scan line coupled to the pixel having the light-transmitting area 221.

For a flexible display device, when the display device is curved, a mura effect may occur in the display device. However, the region where the mura effect occurs can be pre-obtained. Therefore, when a designer designs a display device, the designer adjusts the areas of the light-transmitting areas corresponding to the specific regions where the mura effect occurs. For example, assume that the mura effect occurs in the region 232 when the display device 200 is curved. Therefore, the designer adjusts the areas of the light-transmitting areas in the region 232 such that the area of one light-transmitting area in the region 232 is different from the area of one light-transmitting area in the region 221 or 222.

Figure 2B:
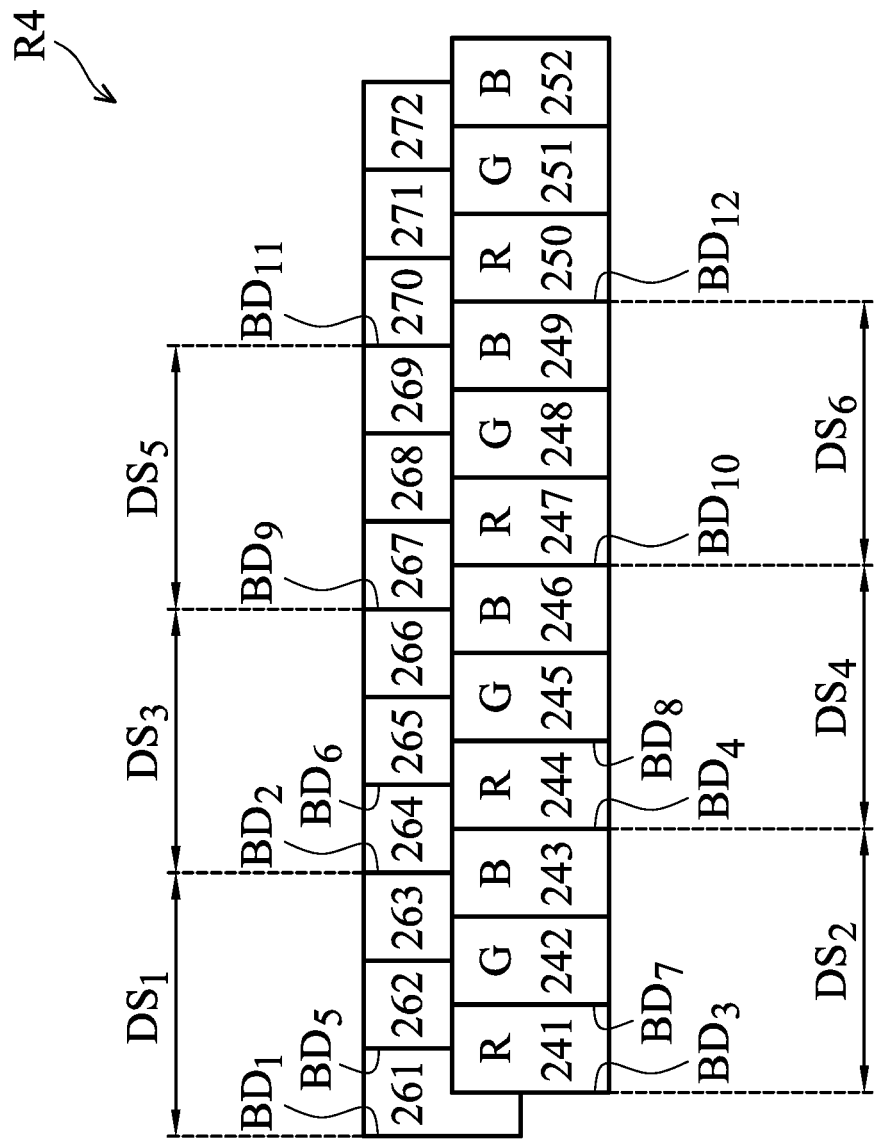
FIG. 2B is a schematic diagram of an exemplary embodiment of a luminescent area, according to various aspects of the present disclosure.

FIG. 2B is a schematic diagram of an exemplary embodiment of the luminescent area R4 shown in FIG. 2A, according to various aspects of the present disclosure. The luminescent area R4 comprises color areas 241~252 and the light-transmitting areas 261~272. In this embodiment, the light-transmitting areas 261~272 are coupled to the same scan line, such as the first scan line $SL_1$. The light-transmitting areas 261~272 correspond to the color areas 241~252 respectively. For example, the light-transmitting area 261 corresponds to the color area 241. Therefore, the light passing through the light-transmitting area 261 will pass through the color area 241. In this case, the light passing through the light-transmitting area 261 does not pass through the color areas 242~252.

In this embodiment, the colors of the lights passing through the color areas 241, 244, 247 and 250 are the same. For example, the colors of the lights passing through the color areas 241, 244, 247 and 250 are red. In addition, the colors of the lights passing through the color areas 242, 245, 248 and 251 are the same. For example, the colors of the lights passing through the color areas 242, 245, 248 and 251 are green. The colors of the lights passing through the color areas 243, 246, 249 and 252 are the same. For example, the colors of the lights passing through the color areas 243, 246, 249 and 252 are blue. To clarity, the color area 241 is referred to as a first color area and the color area 244 is referred to as a second color area. Furthermore, the light-transmitting area 261 overlapped by the color area 241 is referred to as a first light-transmitting area and the second light-transmitting area 264 overlapped by the color area 244 is referred to as a second light-transmitting area.

As shown in FIG. 2B, the first light-transmitting area 261 has a left-side $BD_1$ referred to as a first side and the second light-transmitting area 264 has a left-side $BD_2$ referred to as a second side. The left-side $BD_1$ is parallel to the left-side $BD_2$. There is a distance $DS_1$ between the left-sides $BD_1$ and the left-side $BD_2$. The first color area 241 has a left-side $BD_3$ referred to as a third side and the second color area 244 has a left-side $BD_4$ referred to as a fourth side. The left-side $BD_3$ is parallel to the left-side $BD_4$. There is a distance $DS_2$ between the left-side $BD_3$ and the left-side $BD_4$. In this embodiment, the distance $DS_1$ is different than the distance $DS_2$. Therefore, the pitch between the first light-transmitting area 261 and the second light-transmitting area 264 is different than the pitch between the first color area 241 and the second color area 244. Since the pitches of the light-transmitting areas are different from the pitches of the color areas, when the display device is curved, each color area still covers the corresponding light-transmitting area.

Additionally, the first light-transmitting area 261 further has a right-side $BD_5$ referred to as a fifth side. The right-side $BD_5$ is parallel to the left-side $BD_1$. The second light-transmitting area 264 further has a right-side $BD_6$ referred to as a sixth side. The right-side $BD_6$ is parallel to the left-side $BD_2$. As shown in FIG. 2B, the right-side $BD_5$ is between the left-side $BD_1$ and the left-side $BD_2$, and the left-side $BD_2$ is between the right-side $BD_5$ and the right-side $BD_6$.

Similarly, the first color area 241 further has a right-side $BD_7$ referred to as a seventh side. The right-side $BD_7$ is parallel to the left-side $BD_3$. The second color area 244 further has a right-side $BD_8$ referred to as an eighth side. The right-side $BD_8$ is parallel to the left-side $BD_4$. As shown in FIG. 2B, the right-side $BD_7$ is between the left-side $BD_3$ and the left-side $BD_4$, and the left-side $BD_4$ is between the right-side $BD_7$ and the right-side $BD_8$.

In other embodiments, the light-transmitting area 267 has a left-side $BD_9$. The left-side $BD_9$ is parallel with the left-side $BD_2$. In this case, the distance $DS_3$ is between the left-side $BD_2$ and the left-side $BD_9$. In one embodiment, the distance $DS_3$ is equal to the distance DS" Furthermore, the light-transmitting area 270 has a left-side $BD_{11}$. The left-side $BD_{11}$ is parallel with the left-side $BD_9$. In this case, the distance $DS_5$ is between the left-side $BD_9$ and the left-side $BD_{11}$. In one embodiment, the distance $DS_5$ is equal to the distance $DS_3$.

Additionally, the color area 247 has a left-side $BD_{10}$. The left-side $BD_{10}$ is parallel with the left-side $BD_4$. In this case, the distance $DS_4$ is between the left-side $BD_4$ and the left-side $BD_{10}$. In one embodiment, the distance $DS_4$ is not equal to the distance $DS_1$. The distance $DS_4$ may be longer than or shorter than the distance $DS_1$. Furthermore, the color area 250 has a left-side $BD_{12}$. The left-side $BD_{12}$ is parallel with the left-side $BD_{10}$. In this case, the distance $DS_6$ is between the left-side $BD_{10}$ and the left-side $BD_{12}$. In one embodiment, the distance $DS_6$ is not equal to the distance $DS_4$. In another embodiment, the distance $DS_6$ may be equal to or not equal to the distance $DS_2$. In some embodiments, the distance $DS_2$ is less than the distance $DS_4$ and the distance $DS_6$, and the distance $DS_4$ is less than the distance $DS_6$.

Figure 3:
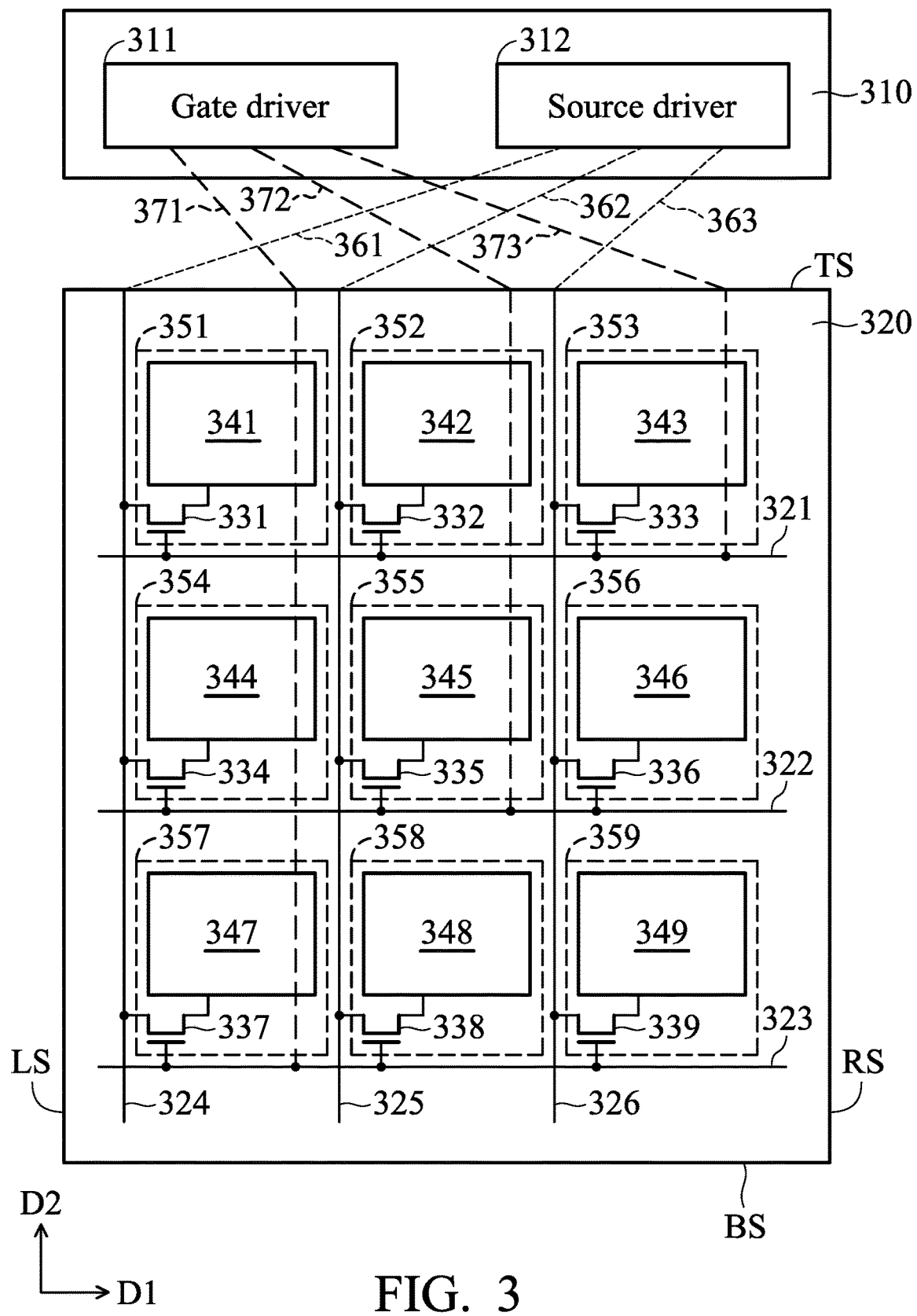
FIG. 3 is a schematic diagram of an exemplary embodiment of an array substrate, according to various aspects of the present disclosure.

FIG. 3 is a schematic diagram of an exemplary embodiment of an array substrate, according to various aspects of the present disclosure. The array substrate 300 comprises a non-display area 310 and a display area 320. The non-display area 310 is located in the side of the display area 320. The non-display area 310 comprises a gate driver 311 and a source driver 312. In this embodiment, the gate driver 311 is located next to the source driver 312.

The display area 320 comprises a top-side TS, a bottom-side BS, a left-side LS and a right-side RS. The top-side TS is parallel with the bottom-side BS and vertical to the left-side LS and the right-side RS. The left-side LS is parallel with the right-side RS and vertical to the top-side TS and the bottom-side BS. In this embodiment, the gate driver 311 and the source driver 312 are next to the top-side TS, but the disclosure is not limited thereto. In some embodiments, the gate driver 311 and the source driver 312 are next to the bottom-side BS, the left-side LS or the right-side RS.

The display area 320 comprises scan lines 321~323 and data lines 324~326. For brevity, FIG. 3 shows three scan lines and three data lines, but the disclosure is not limited thereto. In some embodiments, the display area 320 comprises any suitable number of scan lines and any suitable number of data lines. As shown in FIG. 3, the scan line 321, the scan line 322 and the scan line 323 referred to as a first scan line extend along a first direction D1. The data line 324 referred to as a first data line, the data line 325 and the data line 326 extend along a second direction D2. In this embodiment, the display area 320 further comprises pixels 351~359. Each pixel is coupled to a scan line and a data line. For example, the pixel 357 referred to as a first pixel is coupled to the scan line 323 and the data line 324.

Since the features of pixels 351~359 are the same, pixel 351 is used as an example. As shown in FIG. 3, the pixel 351 at least comprises a switch 331 and a pixel electrode 341. In one embodiment, the switch 331 is a thin-film transistor (TFT). The gate of the TFT is coupled to the scan line 321. The input terminal (e.g. drain) of the TFT is coupled to the data line 324. The output terminal (e.g. source) of the TFT is coupled to the pixel electrode 341. When the scan signal of the scan line 321 turns on the switch 331, the switch 331 transmits the data signal of the data line 324 to the pixel electrode 341 to control the brightness of the light passing through the light-transmitting area (not shown) of the pixel 351.

In one embodiment, a color filter substrate (not shown) is disposed on the pixels 351~359. The color filter substrate comprises a plurality of color filters (not shown). Each color filter covers a pixel. Therefore, the light passing through the pixel also passes through the color filter covering the pixel. For example, the light passing through a first pixel (e.g. the pixel 357) passes through a first color filter, and the light passing through a second pixel (e.g. the pixel 354) passes through a second color filter, wherein the color of the light passing through the first color filter is the same as the color of the light passing through the second color filter. In this case, the area of the light-transmitting area of the first pixel may be different from the area of the light-transmitting area of the second pixel. The disclosure does not limit the positions of the first pixel and the second pixel in the display area 320. The first pixel may be next to the second pixel. In another embodiment, the first pixel and the second pixel are coupled to the same scan line and/or the same data line. In other embodiments, the first pixel and the second pixel may be coupled to different scan lines and/or different data lines. In some embodiments, the areas of the light-transmitting areas of the pixels 351~359 are the same.

In this embodiment, the array substrate 300 further comprises connection lines 361~363 and 371~373. The connection lines 361~363 and 371~373 extend from the non-display area 310 to the display area 320. As shown in FIG. 3, the connection line 361 is coupled between the source driver 312 and the data line 324. The connection line 362 is coupled between the source driver 312 and the data line 325. The connection line 363 is coupled between the source driver 312 and the data line 326. The source driver 312 provides data signals to the data lines 324~326 via the connection lines 361~363 respectively.

Additionally, the connection line 371 is coupled between the gate driver 311 and the scan line 323. In this embodiment, in the display area 320, the direction which the connection line 371 is extended along is the same as the direction which the data line 324 is extended along. For example, the connection line 371 is extended along the direction D2. As shown in FIG. 3, the connection line 371 is parallel with the data line 324. The gate driver 311 provides scan signal to the scan line 321 via the connection line 371. In this embodiment, the connection line 371 overlaps the pixel electrode 341, the pixel electrode 344 and the pixel electrode 347, but the disclosure is not limited thereto. In some embodiments, the connection line 371 may not overlap the pixel electrode 341, the pixel electrode 344 and the pixel electrode 347. The connection line 371 may overlap at least one of the pixel electrode 341, the pixel electrode 344 and the pixel electrode 347.

The connection line 372 is coupled between the gate driver 311 and the scan line 322. In this embodiment, in the display area 320, the direction which the connection line 372 is extended along is the same as the direction which the data line 324 is extended along. The gate driver 311 provides scan signal to the scan line 322 via the connection line 372. As shown in FIG. 3, the connection line 372 overlaps the pixel electrode 342 and the pixel electrode 345, but the disclosure is not limited thereto. In some embodiments, the connection line 372 may not overlap the pixel electrode 342 and the pixel electrode 345. In other embodiments, the connection line 372 may overlap one of the pixel electrode 342 and the pixel electrode 345.

The connection line 373 is coupled between the gate driver 311 and the scan line 321. In this embodiment, in the display area 320, the direction which the connection line 373 is extended along is the same as the direction which the data line 324 is extended along. For example, the connection line 373 is extended along the direction D2. The gate driver 311 provides scan signal to the scan line 323 via the connection line 373. As shown in FIG. 3, the connection line 373 overlaps the pixel electrode 343, but the disclosure is not limited thereto. In some embodiments, the connection line 373 may not overlap the pixel electrode 343.

Since the extending directions of the connection lines 371~373 in the display area 320 are the same as the extending directions of the data lines 324~326, the space of the non-display area in the left-side LS and the right-side RS of the display area 320 is reduced.

Figure 4:
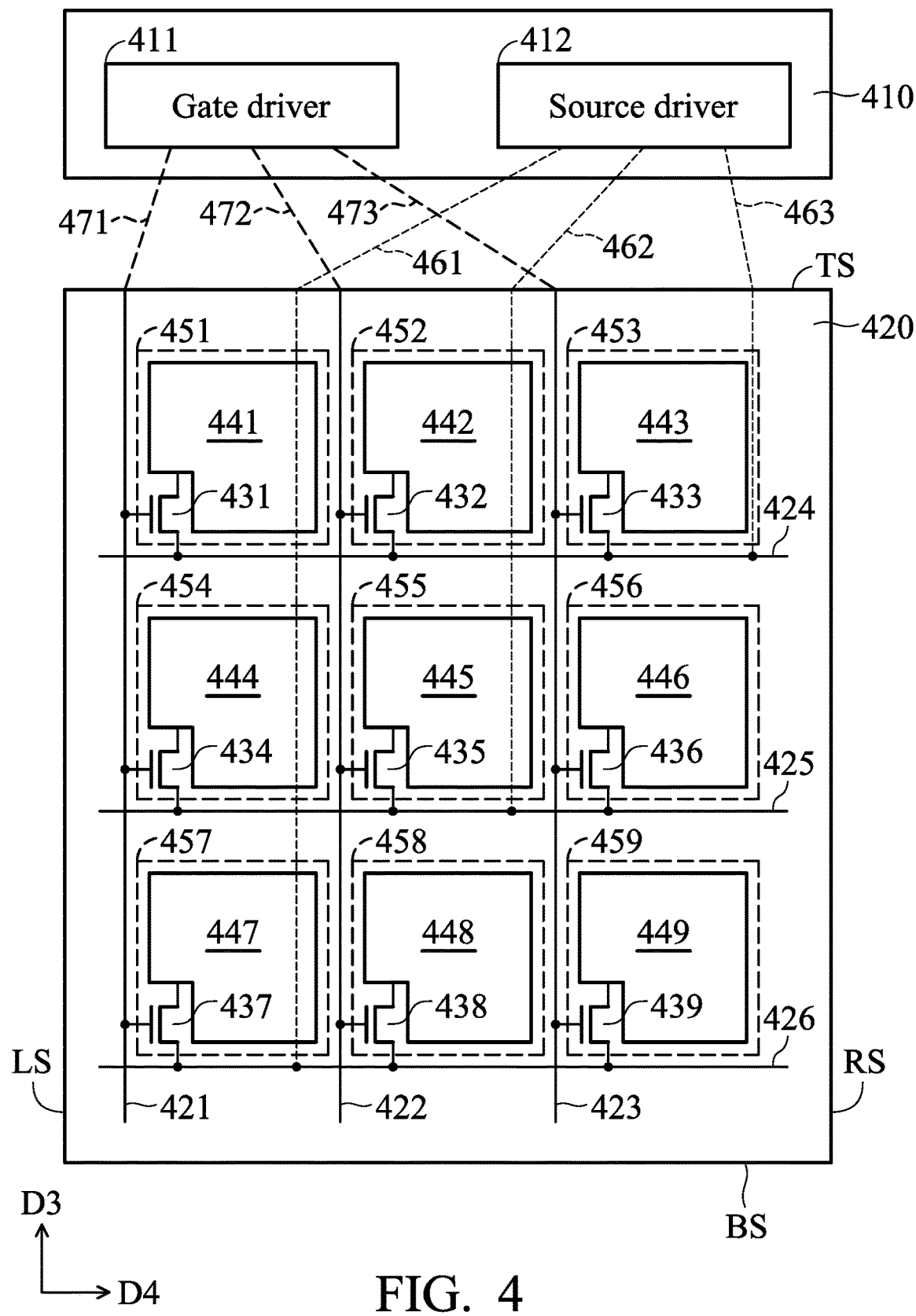
FIG. 4 is a schematic diagram of another exemplary embodiment of an array substrate, according to various aspects of the present disclosure.

FIG. 4 is a schematic diagram of another exemplary embodiment of an array substrate, according to various aspects of the present disclosure. The array substrate 400 comprises a non-display area 410 and a display area 420. The non-display area 410 comprises a gate driver 411 and a source driver 412. The gate driver 411 and the source driver 412 are located next to the top-side TS of the display area 420, but the disclosure is not limited thereto. In some embodiments, the gate driver 411 and the source driver 412 are located next to the bottom-side BS, the left-side LS or the right-side RS of the display area 420. The gate driver 411 is configured to provide scan signals. The source driver 412 is configured to provide data signals.

The display area 420 comprises scan lines 421~423 and data lines 424~426. The scan line 421 referred to as a first scan line, the scan line 422 and the scan line 423 extend along a first direction D3. The data line 424, the data line 425 and the data line 426 referred to as a first data line extend along a second direction D4. In other embodiments, the display area 420 comprises any suitable number of scan lines and any suitable number of data lines. The display area 420 further comprises pixels 451~459. Since the features of the pixels 451~459 shown in FIG. 4 are the same as the features of the pixels 351~359 shown in FIG. 3, the descriptions of the features of the pixels 451~459 shown in FIG. 4 are omitted.

In this embodiment, the array substrate 400 further comprises connection lines 471~472. The connection line 471 is coupled between the gate driver 411 and the scan line 421. The connection line 472 is coupled between the gate driver 411 and the scan line 422. The connection line 473 is coupled between the gate driver 411 and the scan line 423. The gate driver 411 provides scan signals to the scan lines 421~423 via the connection lines 471~473.

The array substrate 400 further comprises connection lines 461~461. The connection lines 461~463 extend from the non-display area 410 to the display area 420. As shown in FIG. 4, the connection line 461 is coupled between the source driver 412 and the data line 426. In this embodiment, the extending direction of the connection line 461 in the display area 420 is the same as the extending direction of the scan line 421 in the display area 420. As shown in FIG. 4, the connection line 461 is parallel to the scan line 421 in the display area 420. In this embodiment, the connection line 461 may cover the pixel electrode 441, the pixel electrode 444 and the pixel electrode 447. In another embodiment, the connection line 461 does not cover the pixel electrode 441, the pixel electrode 444 and the pixel electrode 447. In other embodiments, the connection line 461 covers at least one of the pixel electrode 441, the pixel electrode 444 and the pixel electrode 447.

The connection line 462 is coupled between the source driver 412 and the data line 425. In this embodiment, the extending direction of the connection line 462 in the display area 420 is the same as the extending direction of the scan line 421 in the display area 420. As shown in FIG. 4, the connection line 462 covers the pixel electrode 442 and the pixel electrode 445, but the disclosure is not limited thereto. In another embodiment, the connection line 462 does not cover the pixel electrode 442 and the pixel electrode 445. In other embodiments, the connection line 462 covers the pixel electrode 442 and the pixel electrode 445.

The connection line 463 is coupled between the source driver 412 and the data line 424. In this embodiment, the extending direction of the connection line 463 in the display area 420 is the same as the extending direction of the scan line 421 in the display area 420. As shown in FIG. 4, the connection line 463 does not cover the pixel electrode 443, but the disclosure is not limited thereto. In another embodiment, the connection line 463 covers the pixel electrode 443.

In other embodiments, the areas of the light-transmitting areas of the pixels 451~459 are the same. In another embodiment, the area of the light-transmitting area of a first pixel among the pixels 451~459 is different from the area of the light-transmitting area of a second pixel among the pixels 451~459. In this case, the first pixel corresponds to a first color filter, and the second pixel corresponds to a second color filter, wherein the color of the light passing through the first color filter is the same as the color of the light passing through the second color filter.

Figure 5:
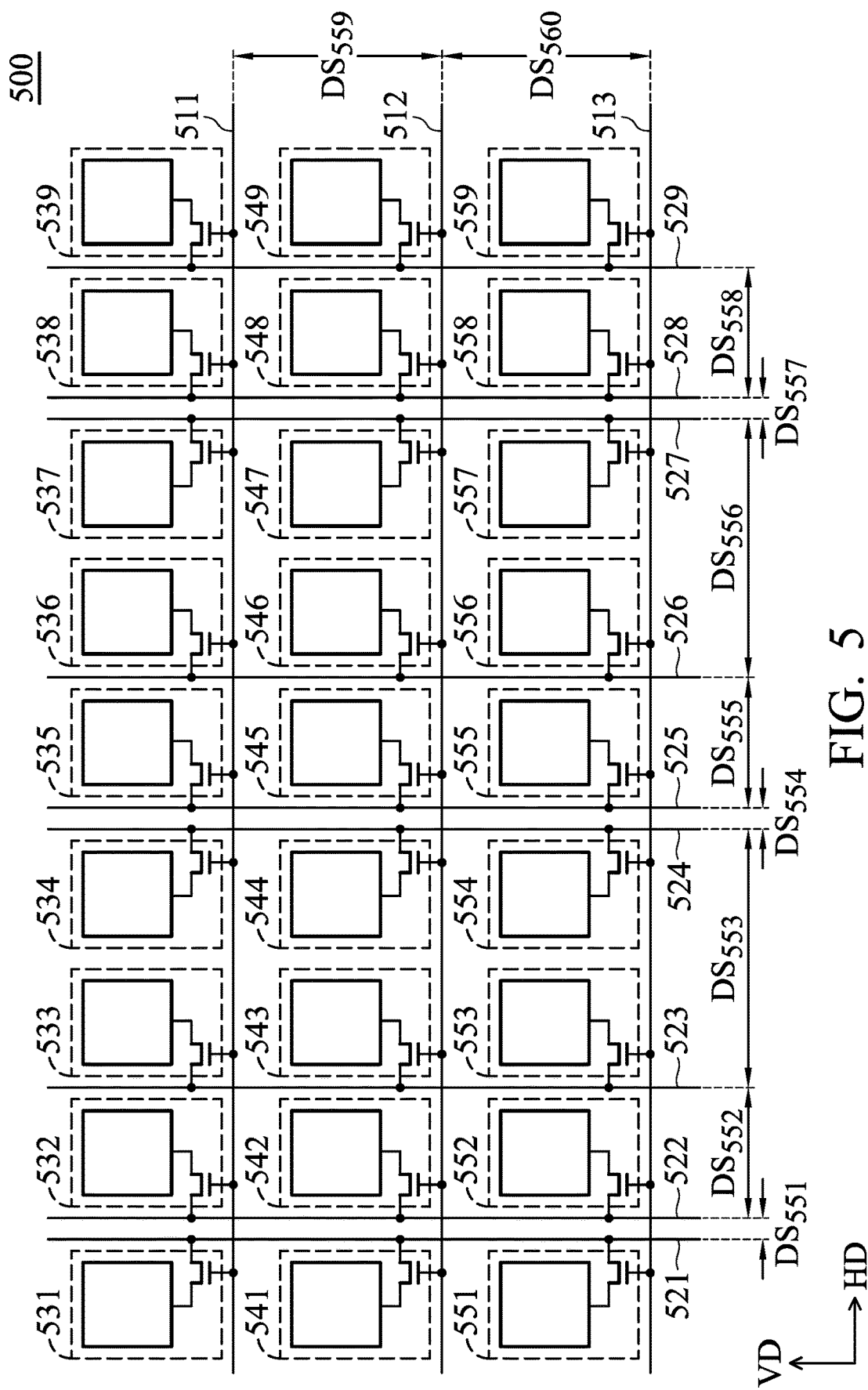
FIG. 5 is a schematic diagram of another exemplary embodiment of an array substrate, according to various aspects of the present disclosure.

FIG. 5 is a schematic diagram of another exemplary embodiment of an array substrate, according to various aspects of the present disclosure. The array substrate 500 comprises scan lines 511~513 and data lines 521~529. The scan lines 511~513 are successively arranged and extended along a first direction HD. The data lines 521~529 are successively arranged and extended along a second direction VD. In other embodiments, the array substrate 500 comprises any suitable number of scan lines and any suitable number of data lines.

In this embodiment, the array substrate 500 further comprises pixels 531~539, 541~549 and 551~559. Each of the pixels 531~539, 541~549 and 551~559 is coupled to a scan line and a data line. For example, the pixel 531 is coupled to the scan line 511 and the data line 521. In one embodiment, the areas of the light-transmitting areas of the pixels 531~539, 541~549 and 551~559 are the same. In another embodiment, the area of the light-transmitting area of a first pixel among the pixels 531~539, 541~549 and 551~559 is different from the area of the light-transmitting area of a second pixel among the pixels 531~539, 541~549 and 551~559. In this case, the light-transmitting area of the first pixel is disposed under the color area of a first color filter and the light-transmitting area of the second pixel is disposed under the color area of a second color filter, wherein the color of the light passing through the color area of the first color filter is the same as the color of the light passing through the color area of the second color filter. For example, the color of the light passing through the color area of the first color filter and the color of the light passing through the color area of the second color filter are red.

Taking the data lines 521~524 as an example, the data line 522 referred to as a second data line is disposed between the data line 521 referred to as a first data line and the data line 523 referred to as a third data line. The data line 522 is next to the data line 521 and the data line 523. In this embodiment, the data line 521 is disposed in the left side of the data line 522. In this case, the data line 521 is closest to the data line 522 among the other data lines which are disposed in the left side of the data line 522. Furthermore, the data line 523 is disposed in the right side of the data line 522. In this case, the data line 523 is closest to the data line 522 among the other data lines which are disposed in the right side of the data line 522. Additionally, the data line 523 is disposed between the data line 522 and the data line 524 referred to as a fourth data line. The data line 523 is next to the data line 522 and the data line 524. In one embodiment, the data line 522 is disposed in the left side of the data line 523. In this case, the data line 522 is closest to the data line 523 among the other data lines which are disposed in the left side of the data line 523. Furthermore, the data line 524 is disposed in the right side of the data line 523. In this case, the data line 524 is closest to the data line 523 among the other data lines which are disposed in the right side of the data line 523. In this embodiment, the distance $DS_{551}$ between the data line 522 and the data line 521 is different from the distance $DS_{552}$ between the data line 522 and the data line 523. In another embodiment, the distance $DS_{553}$ between the data line 523 and the data line 524 is different from the distance $DS_{552}$ between the data line 522 and the data line 523. In this case, the distance $DS_{553}$ is also different than the distance $DS_{551}$, but the disclosure is not limited thereto. In some embodiments, the distance $DS_{553}$ may be the same as the distance $DS_{551}$.

In this embodiment, the distance $DS_{554}$ between the data line 524 and the data line 525 and the distance $DS_{557}$ between the data line 527 and the data line 528 are the same as the distance $DS_{551}$ between the data line 521 and the data line 522. Furthermore, the distance $DS_{555}$ between the data line 525 and the data line 526 and the distance $DS_{556}$ between the data line 528 and the data line 529 are the same as the distance $DS_{552}$ between the data line 522 and the data line 523. The distance $DS_{556}$ between the data line 526 and the data line 527 is the same as the distance $DS_{553}$ between the data line 523 and the data line 524.

In this embodiment, the distance $DS_{559}$ between the scan line 511 referred to as a first scan line and the scan line 512 referred to as a second scan line is the same as distance $DS_{560}$ between the scan line 512 and the scan line 513 referred to as a third scan line. In another embodiment, the distance $DS_{559}$ is different from the distance $DS_{560}$. In this embodiment, the scan line 512 is between the scan line 511 and the scan line 513. As shown in FIG. 5, the scan line 511 and the scan line 513 are the two scan lines which are closest the scan line 512 among the other scan lines.

In one embodiment, a gate driver (not shown) is coupled to the scan lines 511~513 via a plurality of first connection lines (not shown), and a source driver (not shown) is coupled to the data lines 521~529 via a plurality of second connection lines (not shown). The first connection lines may be extended along the second direction VD. In this case, at least one of the first connection lines is disposed between two data lines as shown in FIG. 3. At least one of the first connection lines may overlap the pixel electrode of at least one of the pixels 531~539, 541~549 and 551~559. In other embodiments, at least one of the first connection lines may not overlap the pixel electrodes of the pixels 531~539, 541~549 and 551~559. In another embodiment, at least one of the second connection lines is disposed between two scan lines as shown in FIG. 4. At least one of the second connection lines may overlap the pixel electrode of at least one of the pixels 531~539, 541~549 and 551~559. In other embodiments, at least one of the second connection lines may not overlap the pixel electrodes of the pixels 531~539, 541~549 and 551~559.

It will be understood that when an element or layer is referred to as being "on", "connected to" or "coupled to" another element or layer, it can be directly on, connected or coupled to the other element or layer or intervening elements or layers may be present. In contrast, when an element is referred to as be "directly on", "directly connected to" or "directly coupled to" another element or layer, there are no intervening elements or layers present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A display device, comprising:
a non-display area;
a display area next to the non-display area and comprising:
a first scan line extending along a first direction;
a first data line extending along a second direction;
a first pixel coupled to the first scan line and the first data line and comprising a first light-transmitting area;
a second scan line extending along the first direction;
a second data line extending along the second direction;
a second pixel coupled to the second scan line and the second data line and comprising a second light-transmitting area, wherein a total area of the second light-transmitting area is different from a total area of the first light-transmitting area;
a first color filter overlapping the first pixel and comprising a first color area, wherein when first light passes through the first light-transmitting area and the first color area, a color of the first light is a first color;
a second color filter overlapping the second pixel and comprising a second color area, wherein when second light passes through the second light-transmitting area and the second color area, a color of the second light is a second color, and wherein the second color is the same as the first color;
a third data line extending along the second direction; and
a fourth data line extending along the second direction,
wherein a first pitch between the first light-transmitting area and the second light-transmitting area is different than a second pitch between the first color area and the second color area,
wherein the first data line, the second data line, the third data line, and the fourth data line are successively arranged along the first direction,
wherein a distance between the first data line and the second data line is less than a distance between the second data line and the third data line, and the distance between the second data line and the third data line is less than a distance between the third data line and the fourth data line.

2. The display device as claimed in claim 1,
wherein the second scan line is parallel with the first scan line, a distance between a first side of the first light-transmitting area and a second side of the second light-transmitting area is different from a distance between a third side of the first light-transmitting area and a fourth side of the second light-transmitting area,
wherein the first side is parallel with the second side, and the third side is parallel with the fourth side, and
wherein the first light-transmitting area at least overlaps a portion of the first color area, and the second light-transmitting area at least overlaps a portion of the second color area.

3. The display device as claimed in claim 1, wherein the non-display area comprises:
a gate driver; and
a source driver located next to the gate driver.

4. The display device as claimed in claim 3, further comprising:
a gate driver disposed in the non-display area; and
a connection line coupled between the gate driver and the first scan line and extending from the non-display area to the display area, wherein the connection line is extended along the second direction in the display area.

5. The display device as claimed in claim 4, wherein the connection line is parallel with the first data line.

6. The display device as claimed in claim 4, wherein first pixel further comprises:
a pixel electrode, wherein the connection line overlaps the pixel electrode or does not overlap the pixel electrode.

7. The display device as claimed in claim 1, further comprising:
a source driver disposed in the non-display area; and
a connection line coupled between the source drive and the first data line and extending from the non-display area to the display area, wherein in the display area, the connection line is extended along the first direction.

8. The display device as claimed in claim 7, wherein the connection line is parallel with the first scan line.

9. The display device as claimed in claim 7, wherein the first pixel further comprises:
a pixel electrode, wherein the connection line overlaps the pixel electrode or does not overlap the pixel electrode.

10. A display device comprising:
a display area comprising:
a first scan line extending along a first direction;
a first data line extending along a second direction;
a second data line extending along the second direction;
a third data line extending along the second direction;
a fourth data line extending along the second direction; and
a pixel coupled to the first scan line and the first data line and comprising a pixel electrode;
a non-display area next to the display area and comprising:

a gate driver; and
a source driver located next to the gate driver; and
a connection line coupled between the gate driver and the first scan line, wherein the connection line is extended along the second direction in the display area, and the connection line overlaps the pixel electrode,
wherein the first data line, the second data line, the third data line, and the fourth data line are successively arranged along the second direction,
wherein a distance between the first data line and the second data line is less than a distance between the second data line and the third data line, and the distance between the second data line and the third data line is less than a distance between the third data line and the fourth data line.

11. The display device as claimed in claim 10, wherein in the display area, the connection line is parallel with the first data line.

12. A display device comprising:
a display area comprising:
a first scan line extending along a first direction;
a first data line extending along a second direction;
a second data line extending along the second direction;
a third data line extending along the second direction;
a fourth data line extending along the second direction; and
a pixel coupled to the first scan line and the first data line and comprising a pixel electrode;
a non-display area next to the display area and comprising:
a gate driver; and
a source driver located next to the gate driver; and
a connection line coupled between the source driver and the first data line, wherein in the display area, the connection line is extending along the first direction,
wherein the connection line overlaps the pixel electrode,
wherein the first data line, the second data line, the third data line, and the fourth data line are successively arranged along the second direction,
wherein a distance between the first data line and the second data line is less than a distance between the second data line and the third data line, and the distance between the second data line and the third data line is less than a distance between the third data line and the fourth data line.

* * * * *